US006949182B2

United States Patent
Yano et al.

(10) Patent No.: US 6,949,182 B2
(45) Date of Patent: Sep. 27, 2005

(54) OIL FILTER AND METHOD OF MANUFACTURING THE OIL FILTER

(75) Inventors: Kenji Yano, Hamakita (JP); Kazuhiro Yoshida, Hamakita (JP); Takeo Sugimoto, Hamakita (JP); Akira Uchiyama, Hamakita (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 97 days.

(21) Appl. No.: 10/204,758

(22) PCT Filed: Dec. 25, 2001

(86) PCT No.: PCT/JP01/11392

§ 371 (c)(1),
(2), (4) Date: Aug. 23, 2002

(87) PCT Pub. No.: WO02/051519

PCT Pub. Date: Jul. 4, 2002

(65) Prior Publication Data

US 2003/0010689 A1 Jan. 16, 2003

(30) Foreign Application Priority Data

Dec. 26, 2000 (JP) ........................................ 2000-395626

(51) Int. Cl.[7] ............................................. B01D 35/147
(52) U.S. Cl. ........................ 210/130; 210/232; 210/440
(58) Field of Search ................................. 210/130, 232, 210/440, 443, 444, DIG. 17

(56) References Cited

U.S. PATENT DOCUMENTS

| 4,028,243 | A | | 6/1977 | Offer et al. |
| 5,538,626 | A | * | 7/1996 | Baumann ..................... 210/130 |
| 5,770,054 | A | | 6/1998 | Ardes |
| 5,814,215 | A | | 9/1998 | Bruss et al. |
| 5,922,196 | A | * | 7/1999 | Baumann ..................... 210/232 |

FOREIGN PATENT DOCUMENTS

| JP | 9-136003 | 5/1997 |
| JP | 2000-279711 | 10/2000 |

* cited by examiner

Primary Examiner—David Sorkin
(74) Attorney, Agent, or Firm—Young & Thompson

(57) ABSTRACT

An oil filter for preliminarily confirming a correct assembling of a valve body to a holder and for preventing the valve body from being abnormally assembled. A valve seat 22 is welded to a cap 14 covering a filter element 12. A claw portion for a valve body 25e is formed on the valve body 25, and an engagement portion for the valve body 27e to be engaged with the claw portion for the valve body 25e is formed on a holder 15 assembled with the inner peripheral side of the filter element 12. In addition, a spring member 29 is fitted between the valve body 25 and a spring receiving portion 27 provided for the holder 15. By the engagement of the claw portion for the valve body 25e with the engagement portion for the valve body 27e, the valve body 25 is assembled with the holder 15.

4 Claims, 4 Drawing Sheets

OIL FILTER AND METHOD OF MANUFACTURING THE OIL FILTER

CROSS REFERENCE TO RELATED APPLICATION

This is the 35 USC 37 national stage of International Application PCT/JP01/11392 filed on Dec. 25, 2001, which designated the United States of America.

TECHNICAL FIELD OF THE INVENTION

The present invention relates to an oil filter for filtering an internal combustion engine oil of such as automobile, and more particularly, to an oil filter provided with a relief valve which operates at a time when a filter element clogs.

BACKGROUND ART

The applicant has provided an oil filter provided with a relief valve shown in FIG. 4 (refer to Japanese Patent Application No. HEI 11-92540). This oil filter comprises a filter element 1 having an annular structure through which oil passes, a cap 2 having substantially a cylindrical shape and covering an outer periphery of the filter element 1, a holder 3 fitted into the inside of the filter element 1, and a relief valve 8 which operates at a time when the filter element is clogged. In this FIG. 4, a base of the oil filter to be mounted to an engine side is not illustrated.

A valve seat 4 constituting a relief valve 8 is welded to an inner surface of a top portion of the cylindrical cap 2. This valve seat 4 is formed with a claw portion 4b to be engaged with an upper end portion 3a of the holder 3. And a valve body 5 is mounted to the lower surface of the valve seat 4. The valve body 5 is urged against the valve seat 4 by a coil spring 6, which is disposed between the valve body 5 and a spring receiving portion 7 formed on the holder 3.

In an occurrence that the filter element 1 clogs and pressure difference between a dirty side and a clean side is more than a predetermined pressure, the valve body 5 is depressed against a spring force of the coil spring 6. According to this action, the oil passes around the filter element 1 and passes through an oil passage 4a opened to the valve seat 4.

DISCLOSURE OF THE INVENTION

In the oil filter mentioned above, the valve seat 4 is preliminarily welded to the cap 2, and then, the valve body 5 and the coil spring 6 are assembled to the valve seat 4. Thereafter, the claw portion 4b of the valve seat 4 is engaged with the holder 3.

However, at the time when the claw portion 4b of the valve seat 4 is engaged with the holder 3, there is a fear that the coil spring 6 may shift from a predetermined position and ride on an upper end of the spring receiving portion 7 or a fear that the valve body 5 may get caught in the valve seat 4 and then be assembled with the valve seat 4 in an inclined state. Furthermore, since it is impossible to visually observe the valve seat 4, the valve body 5, and the coil spring 6, etc. from the outside of the cap 2, such abnormal assembling or assembled state cannot be confirmed after these are assembled. Furthermore, it requires careful and difficult work to engage the claw portion 4b of the valve seat 4 to the holder 3 while maintaining the state that the valve body 5 and the coil spring 6 are normally assembled.

An object of the present invention is, therefore, to provide an oil filter capable of visually observing the assembling or assembled state of the valve body and the like to the holder to thereby prevent an incorrect or abnormal assembling thereof.

The present invention will be described hereunder.

Further, it is to be noted that, in the following description, although reference numerals described in the drawings accompanied are added with parenthesis, the present invention should not be defined to one described in the drawings.

In order to achieve the above object, the inventor of the subject application preliminarily assembled a valve body and a spring member to a holder, and after confirmation of correctly assembled state of the valve body with respect to the holder, a valve seat was assembled to the holder. More specifically, the above object is achieved by providing an oil filter, which comprises a cap (14) covering an annular filter element (12), a holder (15) disposed in an inner peripheral side of the filter element (12), a valve seat (22) mounted to the cap (14), a valve body (25) being movable in an axial direction of the holder (15) so as to abut against the valve seat (22), and a spring member (29) disposed between a spring receiving portion (27) formed on the holder (15) and the valve body (25), wherein either one of the holder (15) and the valve body (25) is formed with a claw portion for the valve body (25e) and another one of the holder (15) and the valve body (25) is formed with an engagement portion for the valve body (27e) to be engaged with the claw portion for the valve body (25e), and when the claw portion for the valve body (25e) is engaged with the engagement portion for the valve body (27e), the valve body (25) is assembled with the holder (15).

According to this invention, the valve body and the spring member can be preliminarily assembled with the holder, and after the confirmation of the correctly assembled state of the valve body which is movable in the axial direction with respect to the holder, the valve seat mounted to the cap can be assembled to the holder. Thus, the valve body and the spring member can be prevented from being abnormally assembled.

Further, in one preferred example, the valve body (25) is provided with a valve portion (25a) abutting against the valve seat (22), a wall section (25d) disposed on a side of the valve portion (25a) opposite to a side where the valve portion (25a) abuts against the valve seat (22) and extending in the axial direction of the holder (15), and the claw portion for the valve body (25e) formed on a front end portion of the wall section (25d), and the claw portion for the valve body (25e) is engaged with the engagement portion (27e) formed on the spring receiving portion (27).

According to this invention, since the claw portion formed on the valve body engages with the engagement portion of the holder, the valve body can be prevented from being come off from the holder.

Furthermore, according to one preferred example, the spring receiving portion (27) is formed with a guide hole (27c) into which the wall section (25d) is inserted so that the movement of the wall section (25d) in the axial direction of the holder (15) is guided by an inner peripheral surface of the guide hole (27c).

According to this invention, since the wall section of the valve body is guided by the inner peripheral surface of the guide hole, the valve body can be surely moved in the axial direction with respect to the holder, and in addition, an oblique mounting of the valve body to the holder can be prevented.

Furthermore, in one preferred example of the present invention, either one of the holder (15) and the valve seat (22) is formed with a claw portion for the valve seat (22e) and another one of the holder (15) and the valve seat (22) is formed with an engagement portion for the valve seat (15c)

to be engaged with the claw portion for the valve seat (22e), and when the claw portion for the valve seat (22e) is engaged with the engagement portion for the valve seat (15c), the valve seat (22) is assembled with the holder(15).

According to this invention, the cap, the relief valve and the holder can be integrated, and the filter element can be easily taken out from such integrated structure.

Still furthermore, the above mentioned objects can be achieved according to the oil filter manufacturing method of the present invention, which comprises the steps of engaging a valve body (25) with a holder (15) to be disposed in an inner peripheral side of a substantially annular oil filter (12) and assembling, to the holder (15), the valve body (25) and a spring member (29) disposed between the holder (15) and the valve body (29) and the steps of engaging a valve seat (22) which abuts against the valve body (25) with said holder (15) and assembling the valve seat (22) to the holder (15).

According to this aspect, the valve body and the spring member are preliminarily assembled with the holder, and after the confirmation of the valve body which is correctly assembled and movable in the axial direction with respect to the holder, the valve seat mounted to the cap can be assembled to the holder.

BEST MODE FOR EMBODYING THE INVENTION

Figure 1:
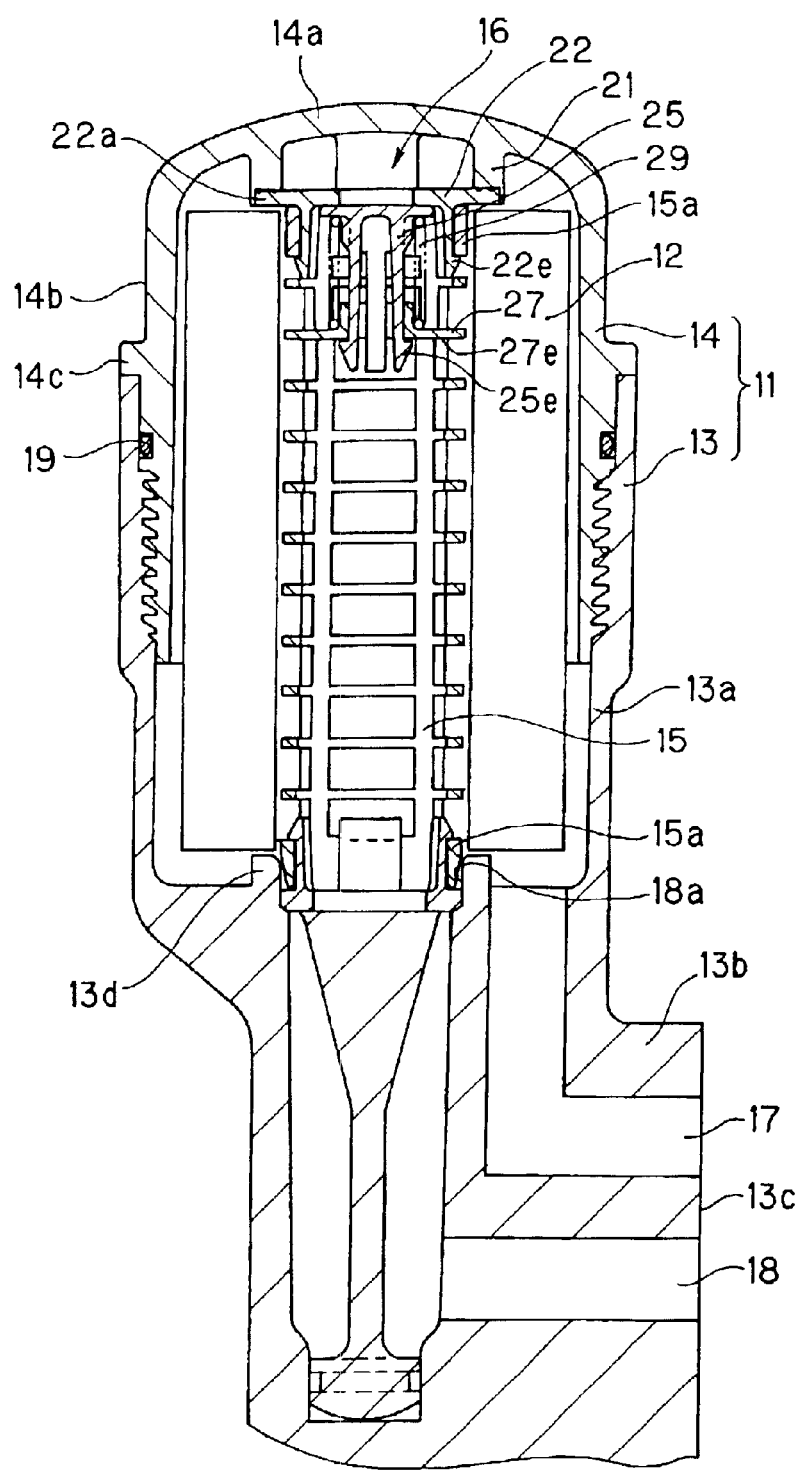
FIG. 1 is a sectional view showing an oil filter according to one embodiment of the present invention.

FIG. 1 illustrates one embodiment of the oil filter of the present invention. This oil filter comprises a housing 11 and a filter element 12 housed therein. The housing 11 is composed of a base 13 to be mounted to an engine side of an automobile or like and an approximately cylindrical cap 14 so as to provide a sealing container structure. On the inner peripheral side of the filter element 12, there is provided a holder 15 for holding the filter element 12. A relief valve 16 is disposed on the upper portion of the holder 15, the relief valve 16 being opened in accordance with pressure difference more than a predetermined value.

The base 13 comprises an upper cylindrical portion 13a and a lower manifold portion 13b. A female screw thread to be screw-engaged with the cap 14 is formed on the upper end side in the inner peripheral portion of the cylindrical portion 13a. The manifold portion 13b is formed with a flow-in passage 17 into which dirty oil exhausted from the engine flows and a flow-out passage 18 through which clean oil filtered by the filter element 12 flows out. One end portions of the flow-in and flow-out passages 17 and 18 are opened to a mounting surface 13c of the base 13 to be mounted to an engine block and other end portions thereof are opened inside the cylindrical portion 13a.

The cap 14 is a mold product of a resin material and comprises a substantially disc-shaped base bottom portion 14a and a cylindrical side portion 14b. The side portion 14b is formed, at its front end side, with a male screw thread and formed, on an outer peripheral surface thereof, with a flange 14c. The cap 14 and the cylindrical portion 13a of the base 13 are engaged together through the screw-engagement between the male screw thread of the cap 14 and the female screw thread of the base till the flange 14c abuts against the end surface of the cylindrical portion 13a. Further, an O-ring 19 is fitted, at the outer periphery of the cap 14, between the flange 14c and the male screw thread portion. This O-ring 19 closely contacts the inner periphery of the cylindrical portion 13a to thereby seal a joining portion of the cap 14 and the cylindrical portion 13a of the base 13.

The filter element 12 having substantially the tubular or annular shape is formed by folding and bending, in zigzag shape, a predetermined filtering member so as to have a number of gussets or ribs. Seal members such as hot-melt which clogs openings formed between the gussets are disposed to both end portions of the filter element 12, and a ring-shaped seal plate is joined.

A holder 15 is arranged inside the filter element 12, and the holder 15 is a mold product of a resin material having approximately a cylindrical shape. Further, this holder 15 is composed of a pair of cylindrical portions 15a, 15a disposed at both longitudinal end portions thereof, a plurality, for example, four, vertical ribs extending in the axial direction of the holder 15 so as to connect the cylindrical portions 15a, 15a and a plurality of horizontal ribs arranged between the cylindrical portions 15a, 15a with equal interval.

The filter element 12 is disposed to be coaxial with the holder 15 by fitting the same to the outer peripheral portions of the vertical and horizontal ribs. Furthermore, the cylindrical portion 15a on the lower side, as viewed, is fitted to an expanded portion 18a of a flow-out passage 18. According to the structure mentioned above, the holder 15 and the filter element 12 held by the holder 15 are positioned to be coaxial with the cylindrical portion 13a of the base 13.

Figure 2:
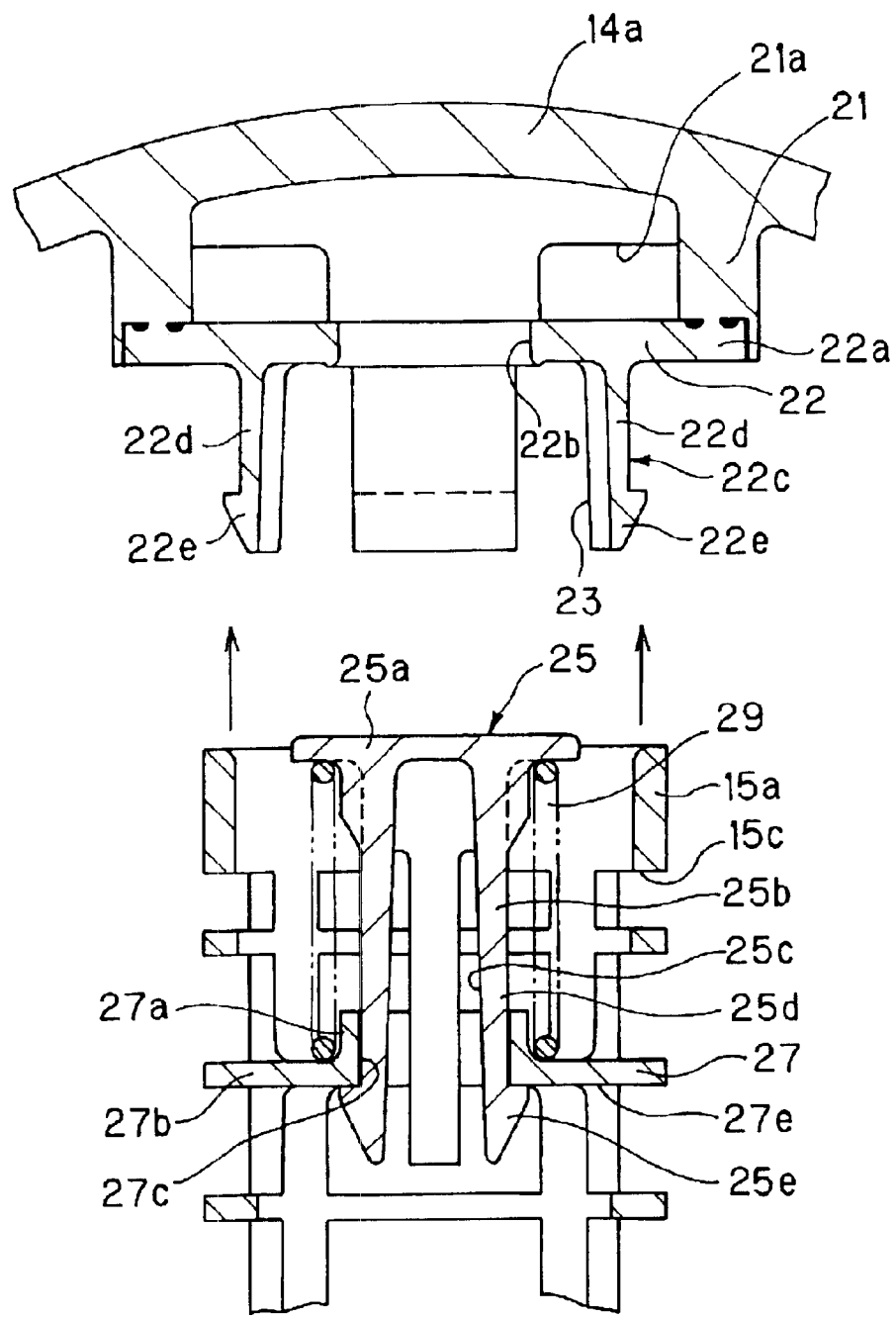
FIG. 2 is a sectional view of a relief valve of the oil filter of FIG. 1.

As shown in detail in FIG. 2, the base end portion (upper end portion in FIG. 1 or 2) 14a of the cap 14 is formed with a plurality of projections 21, 21 - - - extending downward and having downward ends to which a valve seat 22 is joined by joining means such as ultrasonic welding or like. These projections 21 are formed with openings 21a through which oil flows into a space defined by the valve seat 22 and the base end portion 14a.

The valve seat 22 is provided with a disc-shaped member 22a having an oil passing port 22b formed on the central portion of the plate member 22a and a fitting portion 22c extending downward, as viewed in FIG. 2, from a lower surface of the plate member 22a and fitted to the upper cylindrical portion 15a of the holder 15. The fitting portion 22c is sectioned by slits 23 into a plurality of wall sections 22d, 22d, - - -, and each of the wall sections 22d is provided, at its front end (lower end), with a claw portion for the valve seat 22e. The claw portion for the valve seat 22e has a wedge shape tapered inward from upper end to lower end of the valve seat 22. The claw portion for the valve seat 22e is engaged with the lower end surface of the cylindrical portion 15a of the holder 15 as a portion 15c to be engaged for the valve seat 22.

As the valve seat 22 is fitted to the cylindrical portion 15a of the holder 15, the wall sections 22d, 22d, - - - are gradually flexed and deformed, and the wall sections 22d, 22d, - - - are restored in their positions at the time of the claw portion 22e of the valve seat 22 being engaged with the lower end surface of the cylindrical portion 15a. At an instance that the claw portion 22e for the valve seat is once engaged with the lower surface of the cylindrical portion 15a, the valve seat 22 cannot be easily come off from the cylindrical portion 15a even if any force for pulling the valve seat 22 from the cylindrical portion 15a is applied.

Further, although, in the described embodiment, the claw portion 22e is formed on the valve seat 22 and the engagement portion 15c to be engaged with the claw portion 22e is formed on the holder 15, it may be possible to form the claw portion to the holder 15 and form the engagement portion to the valve seat 22.

A valve body 25 is disposed in the inside of an upper end portion of the holder 15, as shown in FIGS. 1 and 2. The valve body 25 is provided with a valve portion 25a having substantially a disc shape abutting against the valve seat 22 and a fitting portion 25b disposed on a side of the valve portion opposite to a side where the valve portion 25a abuts against the valve seat 22 so as to be fitted to the holder 15.

The fitting portion 25b is sectioned by slits 25c into a plurality of wall sections 25d, 25d, - - - extending axially and being flexed or deformed, and each of the wall sections 25d is provided, at its front end (lower end), with a claw portion for the valve body 25e. The claw portion for the valve body 25e has a wedge shape tapered inward from upper end to lower end of the valve body 25. The claw portion 25e for the valve body is engaged with a lower surface of a spring receiving portion 27 formed on the holder 15 as an engagement portion 27e to be engaged. The detail of the spring receiving portion 27 will be described later.

As the valve body 25 is fitted to the spring receiving portion 27, the wall sections 25d, 25d, - - - are gradually flexed and deformed, and the wall sections 25d, 25d, - - - are restored in their positions at the time when the claw portion 25e of the valve body 25 is engaged with the lower end surface of the spring receiving portion 27. At an instance that the claw portion 25e of the valve body 25 is once engaged with the lower surface of the spring receiving 27, the valve body 25 cannot be easily come off from the spring receiving portion 27 even if any force for pulling the valve body 25 from the spring receiving portion 27 be applied. That is, the valve body 25 can be prevented from being come off from the spring receiving portion 27 by the engagement of the claw portion 25e for the valve body with the lower end surface of the spring receiving portion 27.

Further, although, in the described embodiment, the claw portion 25e is formed on the valve body 25 and the engagement portion 27e to be engaged with the claw portion 25e formed on the spring receiving portion 27, it may be possible to form the claw portion 25e for the valve body to the spring receiving portion 27 and form the engagement portion to the valve body 25.

The spring receiving portion 27 for receiving a coil spring 29 is integrally formed on the horizontal ribs of the holder 15. The spring receiving portion 27 is composed of a cylindrical bush 27a and a disc-shaped spring support plate 27b. The bush 27a is formed with a guide hole 27c through which a wall section 25d of the valve body 25 is inserted so that the axial movement of the wall section 25d of the valve body 25 is guided by the inner peripheral wall surface of the guide hole 27c to thereby constitute the valve body 25 to be movable in the axial direction.

A coil spring 29 as a spring member is mounted between the upper surface of the spring receiving portion 27 of the holder 15 and the lower surface of the valve portion 25a of the valve body 25.

Under the condition that the valve body 25 and the coil spring 29 are assembled to the holder 15, the valve body 25 is urged upward by the elastic force of the coil spring 29 and, then, the claw portion for the valve body 25e is engaged with the lower surface of the spring receiving portion 27. Furthermore, under the condition that the valve seat 22 is assembled to the holder 15, the valve seat 22 slightly depresses the valve body 25 against the elastic force of the coil spring. Accordingly, the coil spring 29 is slightly compressed and slightly lowered from the position at which claw portion for the valve body 25e is engaged with the lower surface of the spring receiving portion 27. Then, the coil spring 29 urges the valve body 25 so that the valve body 25 abuts against the valve seat 22.

The cap 14, the holder 15 and the relief valve 16 are assembled as a sub-assembly in accordance with the manner which will be mentioned hereunder.

First, the coil spring 29 is set on the upper surface of the spring receiving portion 27, and the valve body 25 is then placed inside the coil spring 29 and depressed till the claw portion for the valve body 25e is engaged with the lower surface of the spring receiving portion 27. Through this operation, the coil spring 29 is placed, in the compressed state, between the spring receiving portion 27 and the valve body 25. Then, the claw portion for the valve body 25e and the spring receiving portion 27 can be surely engaged with each other by the repulsion force of the coil spring, and the valve body 25 is assembled to the holder 15.

In the next step, the valve body 25 is depressed against the coil spring 29 to thereby confirm the correct operation and assembling state of the valve body 25 and so on. After the confirmation that the correct assembling of the valve body 25 and the coil spring to the holder 15, the holder 15 is pushed so as to fit to the outer peripheral surface of the wall section 22 till the cylindrical portion 15a of the holder 15 substantially contacts the plate portion 22a of the valve seat 22. According to this operation, the claw portion for the valve seat 22e is fitted to the lower end portion of the cylindrical portion 15a of the holder 15. At this time, the coil spring 29 is further slightly compressed. The valve body 25 is pushed against the valve seat 22 by the elastic force of the coil spring 29 in the described state, and at the same time, the claw portion for the valve seat 22e is pushed against the lower surface of the cylindrical portion 15a of the holder 15. According to such operation, the holder 15 and the valve seat 22 are prevented from being come off from each other in the axial direction thereof, and as a result, the cap 14, the holder 15, the valve body 25 and the coil spring 29 are assembled integrally.

The filter element 12 is then mounted to the outer periphery of the holder 15 attached to the cap 14, and thereafter, the cap 14 is assembled with the base 13, so that the seal plates are tightly contacted, at both the end portions of the filter element 12, respectively, to the seal receiving surface 13d of the base 13 and the plate portion 22a of the valve seat 22. Thus, the inside of the housing 11 is defined into the dirty side communicating with the flow-in passage 17 and the clean side communicating with the flow-out passage 18. The oil flowing in the dirty side passes the filter element 12 in the radial direction, then flows into the clean side, and thereafter, returns to the engine through the flow-out passage 18. At an instance when the filter element 12 clogs and a pressure difference between the dirty side and the clean side in the housing exceeds a predetermined value, the valve body 25 is separated from the valve seat 22 against the elastic force of the coil spring 29, thus opening the oil passing hole 22b.

At a time when it is required to change the filter element 12, the cap 14 is removed from the base 13, and then, the cap 14, the relief valve 16, the holder 15 and the filter element 12 are removed all at once integrally. Thereafter, the filter element 12 is drawn out from the holder 15 and then exchanged with another filter element.

Figure 3:
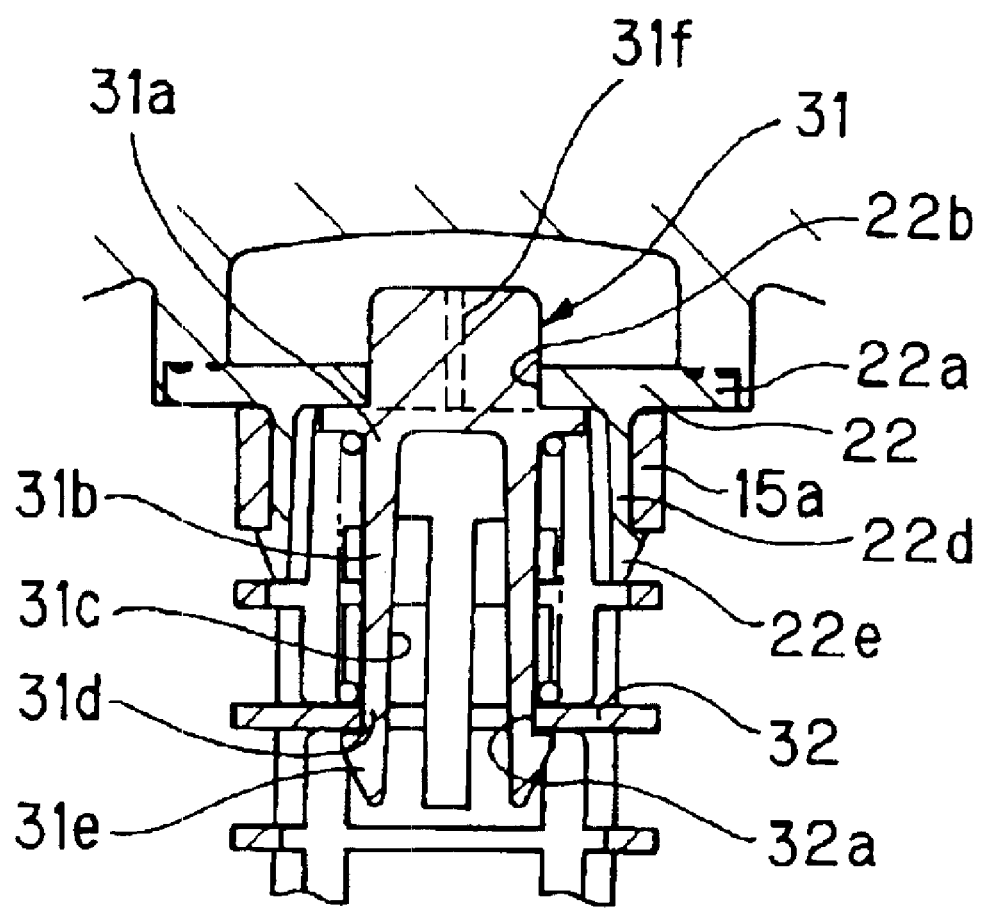
FIG. 3 is a sectional view showing an oil filter according to another embodiment of the present invention.
Figure 4:
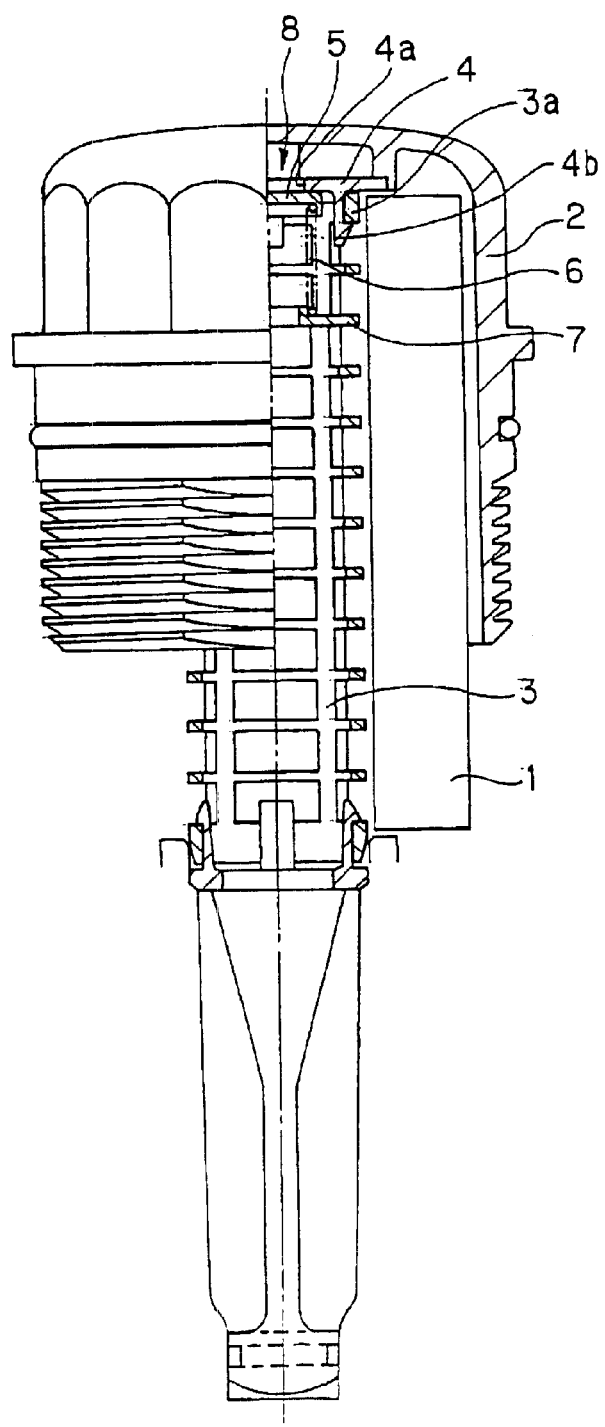
FIG. 4 is a sectional view (partially including a side view) showing an oil filter of conventional structure.

FIG. 3 represents another embodiment of an oil filter according to the present invention. The filter element of this embodiment is similar to the embodiment mentioned hereinbefore except for structures of the cap 14, the valve seat 22 and the spring receiving portion of the holder 15, so that the similar structure is omitted in its explanation only with the same reference numerals.

In this embodiment, a valve body 31 is composed of a disc-shaped valve portion 31a abutting against the valve seat 22 and a fitting portion 31b disposed on a side of the valve portion 31a opposite to a side where the valve portion abuts against the valve seat 22 and fitted to the holder 15. The fitting portion 31b is sectioned, by slits 31c, into a plurality of flexible wall sections 31d extending in the axial direction thereof, and claw portions for the valve body 31e are formed on the front (lower as viewed) end portions of the respective wall sections 31d.

Different from the aforementioned embodiment, in this embodiment, there is formed, on a portion of the valve portion 31a on the side abutting against the valve seat 22, a protruded portion 31f having cross-shaped section projecting inside the oil passing hole 22b opened to the valve seat 22. Further, a spring receiving portion 32 of the holder 15 is not provided with a bush portion, which differs from the aforementioned embodiment, and the spring receiving portion 32 is composed of only a disc-shaped spring support plate. The spring support plate is formed with a guide hole 32a for guiding the wall sections 31d of the valve body 31.

The valve body 31 is guided to be movable in its axial direction at two portions of the protruded portion 31f and the wall section 31d. That is, the protruded portion 31f of the valve body 31 is guided by the inner peripheral surface of the oil passing hole 22b formed on the valve seat 22, and the wall section 31d of the valve body 31 is guided by the inner peripheral surface of the guide hole 32a formed on the spring receiving portion 32. According to the structure of this embodiment, the axial movement of the valve body 31 can be surely guided without forming any cylindrical bush, for guiding the valve body, to the spring receiving portion 32.

Further, it is to be noted that the present invention is not limited to the described embodiments and may be executed with other modified embodiments.

For example, it is not necessary for the spring receiving portion 27 (32) to be formed integrally with the horizontal ribs of the holder 15 and the spring receiving portion may be attached, for example, by means of welding, to an optional position on the holder 15. Moreover, the filter element 12 is not limited to a folded one having a zigzag shape and employs many other shapes.

As mentioned hereinbefore, according to the present invention, the claw portion for the valve body is provided for either one of the holder or the valve body and an engagement portion for the valve body is provided for the other one thereof so as to be engaged with the claw portion for the valve body, and by the engagement of the claw portion for the valve body with the engagement portion for the valve body, the valve body is assembled with the holder. According to this structure, after the preliminary assembling of the valve body and the spring receiving portion and the confirmation of the axial movement of the valve body with respect to the holder, the valve seat can be assembled to the holder.

What is claimed is:

1. An oil filter comprising:

a cap covering an annular filter element;

a holder disposed in an inner peripheral side of said filter element;

a valve seat mounted to said cap;

said valve seat having a plate member and an oil passing hole extending through the plate member;

a valve body being movable in an axial direction of said holder so as to abut against said valve seat;

said valve body having a protruded portion formed on a side abutting against the valve seat;

said protruded portion projecting through the oil passing hole of the valve seat so that the protruded portion is guided by the oil passing hole, and penetrates from a lower side of the plate member past an upper side of the plate member; and a spring member disposed between a spring receiving portion formed on said holder and said valve body, wherein either one of said holder and said valve body is formed with a claw portion for the valve body and another one of the holder and the valve body is formed with an engagement portion for the valve body to be engaged with said claw portion for the valve body, and when said claw portion for the valve body is engaged with the engagement portion for the valve body, the valve body is assembled with the holder, and either one of said holder and said valve seat is formed with a claw portion for the valve seat and another one of the holder and the valve seat is formed with an engagement portion for the valve seat to be engaged with said claw portion for the valve seat, and when said claw portion is engaged with the engagement portion for the valve seat, the valve seat is assembled with the holder.

2. An oil filter according to claim 1, wherein said valve body is provided with a valve portion abutting against the valve seat, a wall section disposed on a side of the valve portion opposite to a side where the valve portion abuts against the valve seat and extending in the axial direction of the holder, and the claw portion for the valve body formed on a front end portion of said wall section, and said claw portion for the valve body is engaged with said engagement portion formed on said spring receiving portion.

3. An oil filter according to claim 2, wherein said spring receiving portion is formed with a guide hole into which said wall section is inserted so that movement of the wall section in the axial direction of the holder is guided by an inner peripheral surface of said guide hole.

4. A method of manufacturing an oil filter comprising the steps of:

engaging a valve body with a holder to be disposed in an inner peripheral side of a substantially annular oil filter;

assembling, to said holder, said valve body and a spring member disposed between the holder and the valve body;

providing a valve seat having a plate member and an oil passing hole extending through the plate member;

engaging the valve seat which abuts against the valve body with said holder, while a protruded portion of the valve body projects through the oil passing hole of the valve seat so that the protruded portion is guided by the oil passing hole, and penetrates from a lower side of the plate member past an upper side of the plate member; and assembling said valve seat to said holder.

* * * * *